US009201499B1

(12) United States Patent
Chang et al.

(10) Patent No.: US 9,201,499 B1
(45) Date of Patent: Dec. 1, 2015

(54) OBJECT TRACKING IN A 3-DIMENSIONAL ENVIRONMENT

(71) Applicant: Rawles LLC, Wilmington, DE (US)

(72) Inventors: Samuel Henry Chang, San Jose, CA (US); Ning Yao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 175 days.

(21) Appl. No.: 13/764,741

(22) Filed: Feb. 11, 2013

(51) Int. Cl.
*G06F 3/01* (2006.01)
*G06F 3/038* (2013.01)
*G06F 3/042* (2006.01)

(52) U.S. Cl.
CPC .............. *G06F 3/011* (2013.01); *G06F 3/0386* (2013.01); *G06F 3/0425* (2013.01)

(58) Field of Classification Search
CPC .............................. G06F 3/0425; G06F 3/0386
USPC ................................................. 382/103, 154
See application file for complete search history.

(56) References Cited

U.S. PATENT DOCUMENTS

| 2009/0169052 | A1* | 7/2009 | Seki et al. ...................... 382/103 |
| 2011/0194732 | A1* | 8/2011 | Tsuji ............................. 382/103 |
| 2012/0165096 | A1* | 6/2012 | Geisner et al. .................. 463/36 |
| 2012/0223885 | A1  | 9/2012 | Perez |
| 2012/0309532 | A1* | 12/2012 | Ambrus et al. ................. 463/36 |
| 2013/0170696 | A1* | 7/2013 | Zhu et al. ...................... 382/103 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Gerald Johnson
*Assistant Examiner* — Christopher Kohlman
(74) *Attorney, Agent, or Firm* — Lee & Hayes, PLLC

(57) ABSTRACT

The movement of an object is tracked in a 3D environment. In some cases, the object is a hand which may be used for gesture input to an augmented reality system. In a particular implementation, 3D images of the environment may be captured and 2D contours of objects within the environment may be generated. Overlap between regions defined by the 2D contours of objects in the 3D images may be utilized to determine whether an object in a first 3D image is the same as an object in a second 3D image that is captured subsequent to the first 3D image.

20 Claims, 7 Drawing Sheets

OBJECT TRACKING IN A 3-DIMENSIONAL ENVIRONMENT

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

One challenge with utilizing user motions and gestures as inputs to automated systems can be tracking the movement of a user's hand over time. Accordingly, there is a need to improve ways to track the hand of a user within a scene or environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
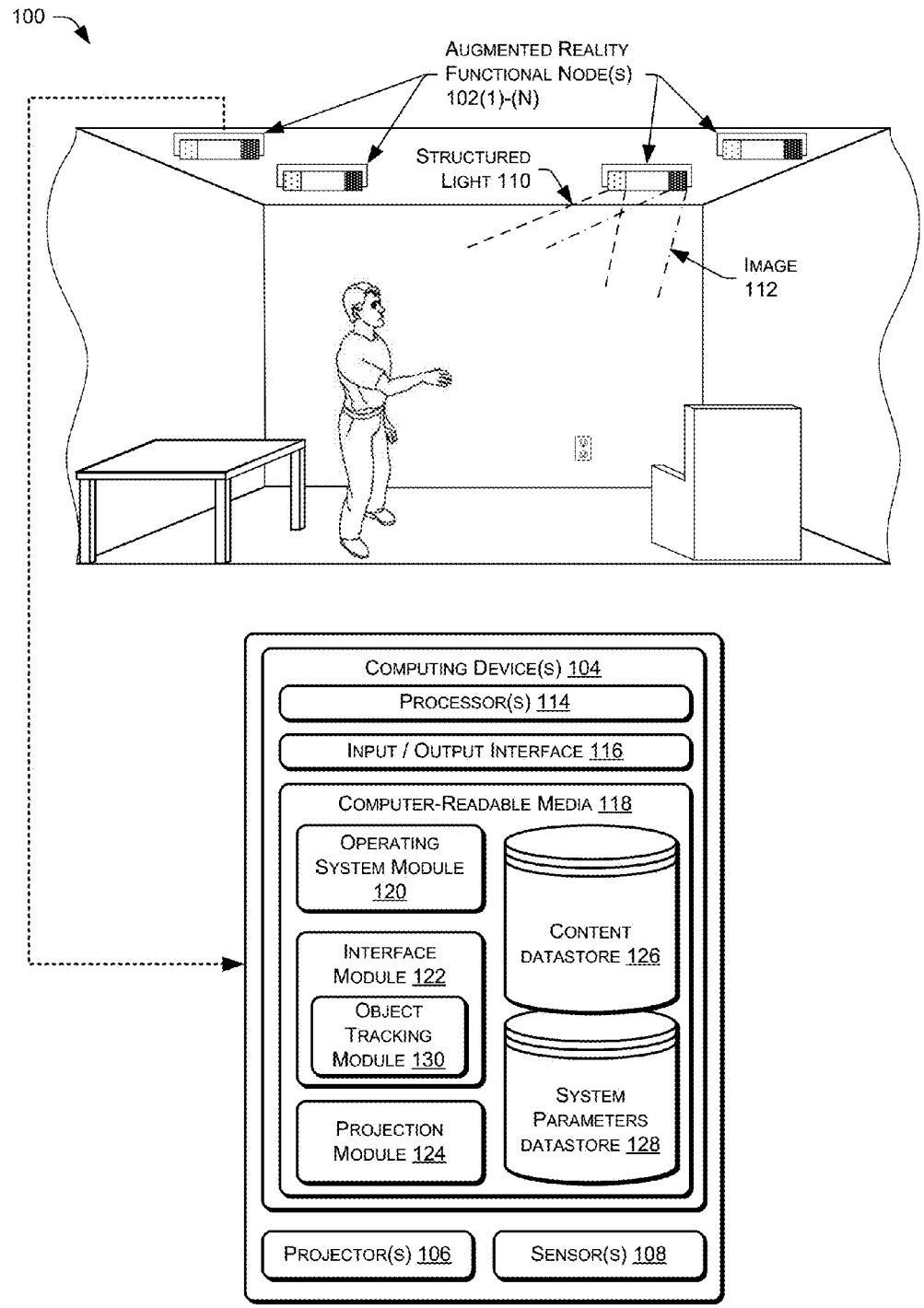
FIG. 1 illustrates an environment that includes an augmented reality functional node (ARFN) and a user that may interact with the ARFN using hand gestures.

Described herein are systems and techniques for object tracking in a 3-Dimensional (3D) environment. In one particular implementation, the object is a hand and the techniques generate contours of the hand in images captured over time. As used herein, the terms "hand" or "hand segment" may refer to one or more portions of a hand, such as a finger portion, a thumb portion, a palm portion, a backside of the hand portion, or a combination thereof. The terms "hand" or "hand segment" may also refer to additional parts of the body, such as a wrist portion, a forearm portion, or a combination thereof. The contours of the hand may be utilized to track the motion of the hand and to determine an amount of overlap between a first region of the hand from one image and a second region of the hand from a subsequent image. In some cases, multiple objects in an image may overlap with the hand of a previously captured image. In these situations, a similarity metric may be calculated for each object to identify a particular object of the multiple objects that is the same as the hand from the previously captured image.

In one implementation, a series of 3D images of a scene may be obtained via one or more sensors, such as cameras, over time. Data from a first 3D image of the scene may be analyzed to determine whether a hand is present. Once a hand is identified in the first 3D image, the hand may be tracked in 3D images captured subsequent to the particular 3D image. To illustrate, data for a second 3D image captured subsequent to the first 3D image, may be analyzed to determine if a hand is present. When a hand is present in the second 3D image, the data may be analyzed to determine whether the hand of the second 3D image is the same as the hand of the first 3D image.

In particular, the 3D information from the first 3D image and the second 3D image may be segmented to identify respective continuous surfaces of the first 3D image and the second 3D image. Boundaries of the continuous surfaces may be determined and 2D contours of the hand in the first 3D image and the hand in the second 3D image may be produced from the boundaries of the continuous surfaces in the first 3D image and the second 3D image. The contours of the hand in the first 3D image and the second 3D image may be utilized to determine whether a region defined by the contours generated from the first 3D image overlaps with a region defined by the contours generated from the second 3D image. In some instances, when an amount of overlap between a region of the hand from the first 3D image and a region of the hand from the second 3D image satisfies a threshold amount, the system may designate that the first hand and the second hand are the same.

In another implementation, the second 3D image may include multiple objects that overlap with the hand from the first 3D image. In these situations, a similarity analysis may be performed to determine the respective object from the second 3D image that overlaps with the hand from the first 3D image that is most similar to the hand of the first 3D image. A similarity analysis may also be performed when there are no objects in the second 3D image that overlap with the hand in the first 3D image. In this way, when an object in the second 3D image has sufficient similarity with respect to the hand in the first 3D image, the object in the second 3D image may be designated as being the same as the hand in the first 3D image.

In some situations, a similarity analysis may determine that there are a number of objects in the second 3D image that are similar to the hand in the first 3D image. In these cases, the object having a similarity metric value that is greater than the similarity metric value of the other objects in the second 3D image is designated as the hand from the first 3D image. In some cases, the similarity analysis may determine that there are no objects in the second 3D image that are sufficiently similar to the hand of the first 3D image. For example, the hand of the first 3D image may have moved into the view of a different sensor capturing data with respect to the scene.

Various types of cameras and sensors may be used to capture images representing the scene and a person's hand within the scene. In some instances, the described techniques may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

Example Environment

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment 100 may request that the ARFN 102 project a particular electronic book that the user wishes to read. In response, the ARFN 102 may project the book onto a projection surface within the environment 100. In another example, the user may request that the ARFN 102 project a particular movie or show that the user wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more sensor(s) 108 that may obtain data from the environment 100. In some implementations, the sensors 108 may include cameras (e.g., motion and/or still cameras), audio sensors (e.g., microphones), ultrasound transducers, heat sensors, motion detectors (e g, infrared imaging devices), depth sensing cameras, weight sensors, touch sensors, tactile output devices, olfactory sensors, temperature sensors, humidity sensors, pressure sensors, or combinations thereof. In a particular implementation, the sensors 108 may include cameras that capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user without reference to a UI projected within the environment 100.

In this example, one of the ARFNs 102 within the environment 100 is shown to project structured light 110. In addition, the ARFN 102 may capture one or more images 112 within the environment 100 for the purpose of identifying distortions in the structured light 110. While FIG. 1 illustrates one ARFN 102 projecting this structured light and imaging the environment 100 to identify the distortions, in some implementations, one or more other ARFNs 102 may additionally or alternatively perform these functions. In either instance, by imaging the environment 100 in this manner, the ARFNs 102 may identify the user's gestures within the environment. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects, such as a hand, in a scene.

As illustrated, the computing device 104 of the example ARFN 102 includes one or more processors 114, an input/output interface 116, and memory or computer-readable media 118. The processors 114 may be configured to execute instructions, which may be stored in the computer-readable media 118 or in other computer-readable media accessible to the processors 114.

Figure 2:
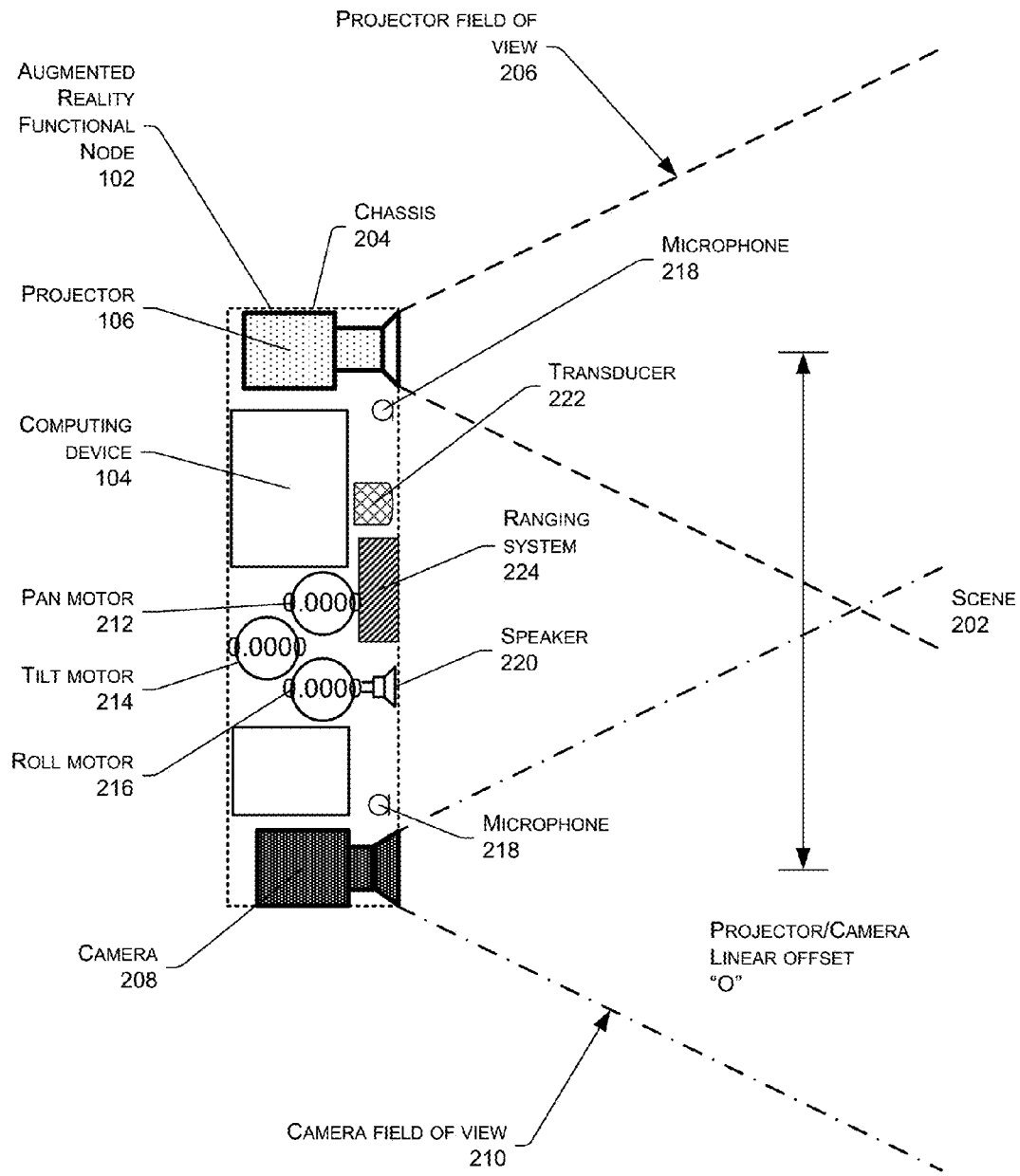
FIG. 2 illustrates an example ARFN that includes a computing device, a projector, a camera, and other selected components for allowing a user to interact with the ARFN with the use of gestures interpreted by the ARFN.

The input/output interface 116, meanwhile, may be configured to couple the computing device 104 to other components of the ARFN 102, such as the projector 106, the sensor 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensor 108, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN 102, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the sensor 108 to identify one or more hands in the environment 100. In response to recognizing a hand and identifying a gesture formed by the hand, the interface module 122 may interpret the gesture and cause the ARFN 102 to perform a corresponding action. For instance, if a user within the environment 100 makes a gesture requesting that the ARFN 102 project a certain piece of content, the interface module 122 may interpret the gesture and cause the projection module 124 to project the content via the projector 106.

The interface module 122 may include an object tracking module 130 to track the motion of particular objects, such as hands, within the environment 100. As will be described in more detail, the object tracking module 130 generates 2D contours of 3D objects in the environment 100. The object tracking module 130 may analyze contours of objects included in a series of 3D images to determine whether a particular object in at least one of the 3D images is the same object included in previously captured 3D images.

The content datastore 126, meanwhile, stores content to be output within the environment 100. For instance, the content datastore 126 may store applications and data for use within the environment 100. The projection module 124 may access the content datastore 126 in order to project requested content within the environment 100. For instance, when a user requests that the ARFN 102 project a particular electronic book, the projection module 124 may access the content datastore 126 to retrieve and cause the projection of the desired electronic book.

The computer-readable media 118 may also store the system parameters datastore 128, which is configured to maintain information about the state of the computing device 104, the projector 106, the sensor 108, and so forth. For example, and as described in detail below, the ARFN 102 may be configured to pan and tilt for the purpose of allowing the projector 106 and the sensor 108 to access different projection surfaces in the environment 100. As such, the system parameters maintained in the system parameters datastore 128 may include current pan and tilt settings of the projector 106 and the sensor 108, an indication of content that the ARFN 102 is currently projecting or otherwise outputting, and the like.

The system parameter datastore 128 (or another datastore) may further store a library of reference gestures that may be used to interpret user gestures. As illustrated, the user in the environment 100 may make gestures with his body, such as hand motions, that can be captured by the sensors 108. The computing device 104 may identify motion parameters corresponding to the observed gesture and compare the observed motion parameters to those of the library of reference gestures. The computing device 104 may then classify the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the scene 202. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector 106. For example, the projector field of view 206 may narrow upon application of an optical zoom to the projector 106.

One or more cameras 208 may also be disposed within the chassis 204. The camera 208 is configured to image the scene in visible light wavelengths, non-visible light wavelengths, or both. The camera 208 has a camera field of view 210 that describes a particular solid angle. The camera field of view 210 may vary according to changes in the configuration of the camera 208. For example, an optical zoom of the camera 208 may narrow the camera field of view 210.

In some implementations, a plurality of cameras 208 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 208. For example, in one implementation the actuator may comprise a pan motor 212, a tilt motor 214, a roll motor 216, and so forth. The pan motor 212 is configured to rotate the chassis 204 in a yawing motion. The tilt motor 214, meanwhile, is configured to change the pitch of the chassis 204. The roll motor 216 is configured to move the chassis 204 in a rolling motion. By panning, tilting, and/or rolling the chassis 204, different views of the scene 202 may be acquired.

One or more microphones 218 may be disposed within the chassis 204, or elsewhere within the scene 202. These microphones 218 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 218 and used to summon an active zone within the scene 202.

One or more speakers 220 may also be present to provide for audible output. For example, the speakers 220 may be used to provide output from a text-to-speech module or to playback pre-recorded audio.

A transducer 222 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 224. The ranging system 224 is configured to provide distance information from the ARFN 102 to a scanned object or a set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 208. Placement of the projector 106 and the camera 208 at a distance "O" from one another may aid in the recovery of 3D structured light data from the scene 202. The known projector/camera linear offset "O" may also be used to calculate distances, dimensioning, and otherwise aid in the characterization of objects within the scene 202. In other implementations the relative angle and size of the projector field of view 206 and camera field of view 210 may vary. Also, the angle of the projector 106 and the camera 208 relative to the chassis 204 may vary.

In other implementations, the components of the ARFN 102 may be distributed in one or more locations within the scene 202. As mentioned above, microphones 218 and speakers 220 may be distributed throughout the environment that includes the ARFN 102. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

3D Analysis Using Structured Light Pattern

Figure 3:
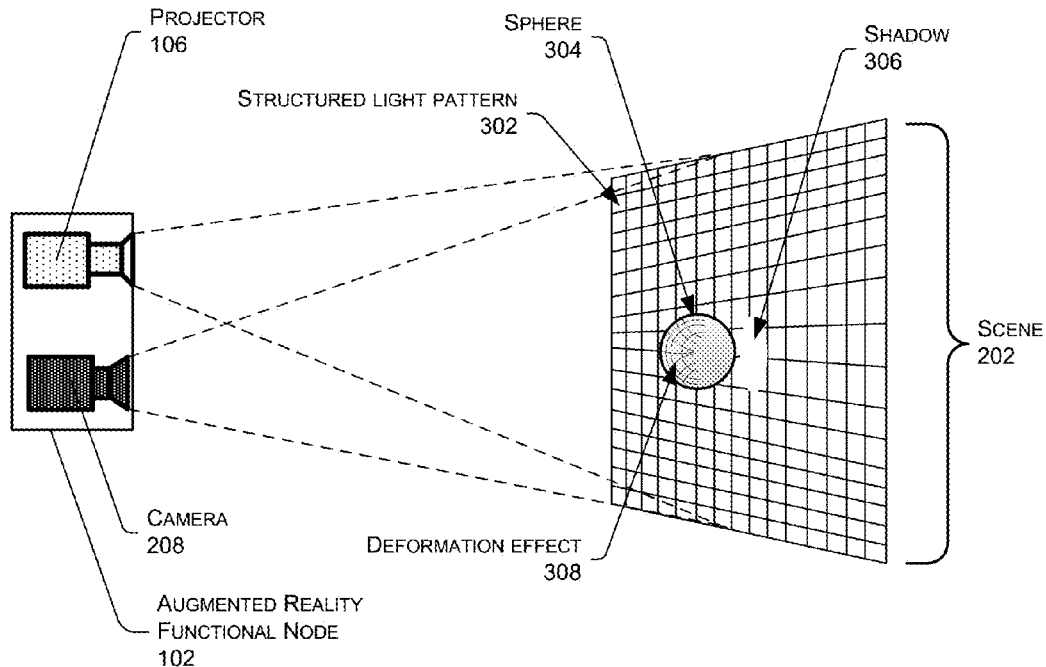
FIG. 3 is an illustrative diagram of the ARFN using structured light to identify surfaces, objects, and user interactions within an environment.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to a user within the scene 202, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene 202. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene 202. Where the projector 106 and camera 208 have differing fields of view, such as shown in FIG. 2, the dispersion or change in the "density" of the structured light pattern 302 may be used to determine depth of field.

The camera 208 may detect the interaction of the structured light pattern 302 with objects within the scene 202. For example, the deformation effect 308 on the sphere 304 may be detected by the camera 208. The camera 208 may similarly identify deformation effects on users within the scene 202 and may utilize this information to identify user gestures and trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Detecting Hand Poses

Figure 4:
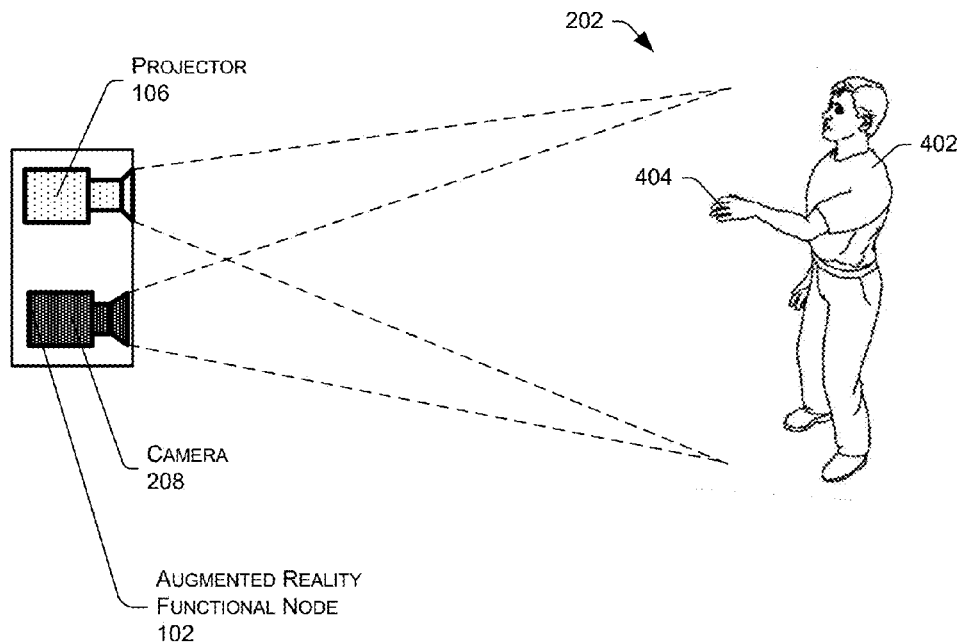
FIG. 4 is an illustrative diagram of the ARFN detecting an object, such as the user's hand, within an environment.

FIG. 4 illustrates an example of how the ARFN 102 may be used to observe and identify hand gestures within the scene

202. FIG. 4 shows a person 402 and the person's hand 404 as examples of objects within the scene 202 that may be analyzed by the ARFN 102.

In order to identify hand gestures, the ARFN 102 detects and tracks the hand 404 within the scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described herein, the camera 208 may be used in conjunction with a structured light pattern projected by the projector 106 to capture 3D information regarding objects within the scene 202. Specifically, the projector 106 may project a structured light pattern onto the scene 202, and the camera 208 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 208 of the ARFN 102 may be used to capture 2D images of the scene 202. For example, the camera 208 may be used in conjunction with ambient lighting, with or without further illumination by the projector 106, to capture a 2D image of the scene 100. The captured 2D image may be a color or grayscale image, comprising an array of pixels defined by tone or color intensities.

As described herein, the projector 106 may be configured to project non-visible light, or light of a specific wavelength that can be filtered by the camera 208 or by electronics associated with the camera 208. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Object (E.G., Hand) Tracking

Described below are techniques of using a projection and imaging system (e.g., an ARFN 102) to track objects in a sequence of images, such as images including a hand or hand segment. The various processes described below with reference to FIGS. 5 and 10 may be implemented by the architectures described herein, or by other architectures. Each process is illustrated as a collection of blocks in a logical flow graph. Some of the blocks represent operations that can be implemented in hardware, software, or a combination thereof. In an illustrative example, the operations may be implemented via one or more of the modules 120, 122, 124, and 130 of the ARFN 102 of FIG. 1. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
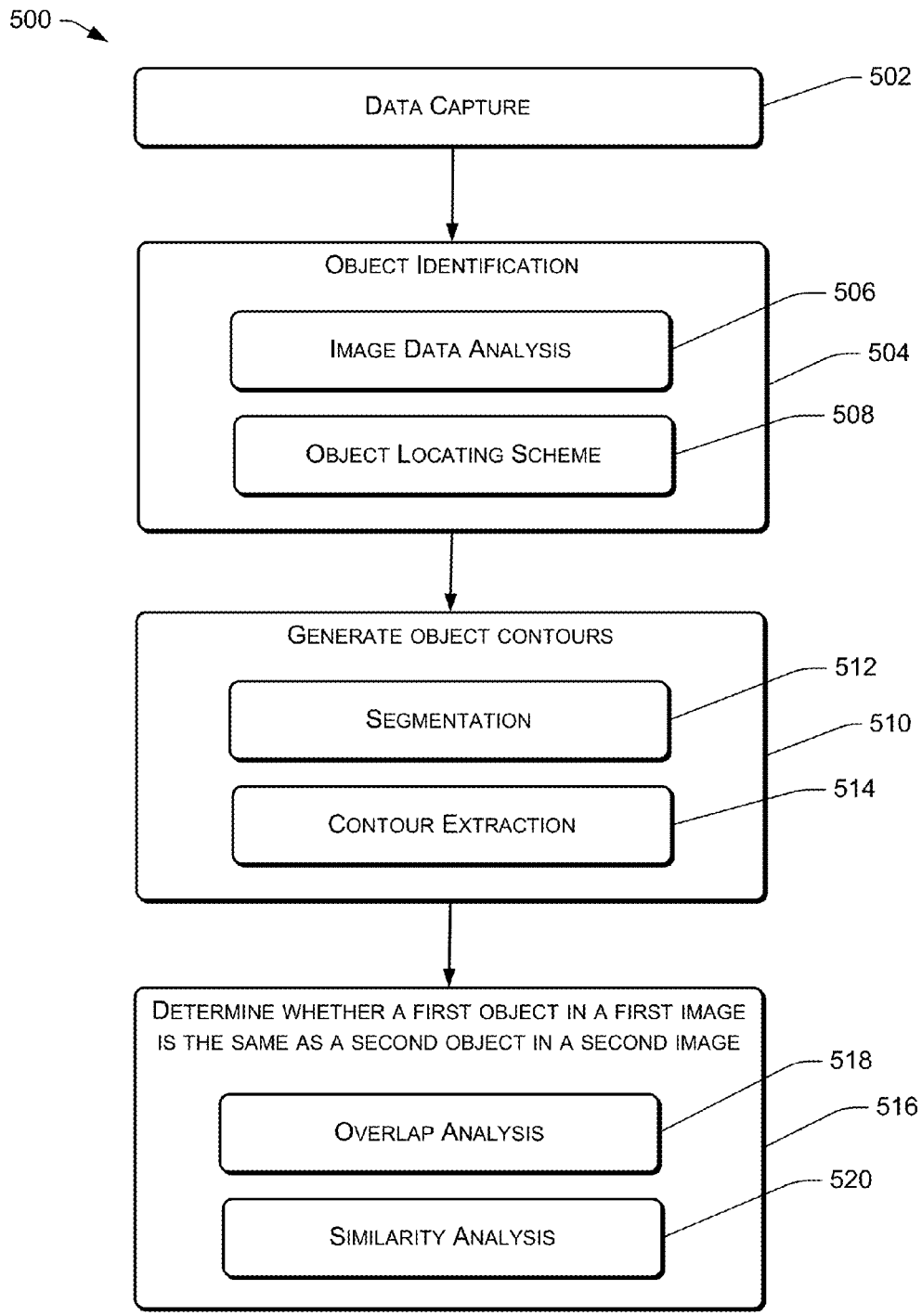
FIG. 5 illustrates an example flow diagram of an ARFN analyzing or monitoring an environment to determine whether an object in a first image is the same as the object in a second image.

FIG. 5 illustrates an example process 500 of an ARFN analyzing or monitoring an environment to determine whether an object in a first image is the same as the object in a second image that is captured subsequent to the first image. By determining that an object in an image is the same as the object in a previously captured image, the movement of the object within the environment can be tracked. The tracking of the object within the environment may allow data associated with the object to be gathered over time and analyzed. For example, the movement of the hand of a user within the environment may be tracked in order to analyze gestures made by the hand that correspond to particular inputs or commands to a system that includes the ARFN. The process 500 will be described as being performed in the environment described above with reference to FIGS. 1-4. However, the process 500 may be performed in other environments, using other means of image capture and/or scene analysis.

At 502, data is captured by one or more of the sensors 108 of the ARFN 102. For example, images of a scene 202 within the environment 100 may be captured via the cameras 208. In one implementation, the images may include a series of 3D images captured over time. In a non-limiting illustrative example, the sensor 208 may capture at least thirty 3D images of the scene per second. In some cases, the data captured by the one or more sensors 108 may also include 2D images. In particular situations, the 2D images captured by the one or more sensors 108 may correspond to respective 3D images captured by the one or more sensors 108. Additionally, data may be captured by the sensors 108 by detecting the interaction between the structured light pattern 302 and objects within the scene 202, such as the hand 404 of the user 402.

At 504, one or more objects within the images may be identified. For example, at 506, 2D image data, 3D image data, additional data captured by the one or more sensors 108, or a combination thereof, may be analyzed to identify objects within the scene 202. In an illustrative implementation, one or more hand segments in the scene 202 may be identified. For example, the data captured by the one or more sensors 108 may be analyzed to identify areas of the scene 202 that include flesh tones, areas of the scene 202 that have the shape of a hand, areas of the scene 202 that have the shape of portions of a hand (e.g., fingers, thumb), or a combination thereof.

In some cases, when a particular object is not identified in the scene 202, such as a hand, the process 500 may include, at 508, implementing an object locating scheme. For example, when a hand is not within the camera field of view 210, the ARFN 102 may be configured to change the camera field of view 210 until data is captured within the camera field of view 210 indicating that a hand is present. In another example, when the environment 100 includes a number of cameras and a hand is not included in the field of view of one of the cameras, data captured from the other cameras in the environment 100 may be analyzed to determine whether a hand is included in the field of view of the other cameras. To illustrate, the user 402 may move within the environment 100 such that the hand 404 is included in the field of view of cameras in different ARFNs 102. Accordingly, data from a number of the ARFNs 102 may be analyzed to track the movement of the hand 404 in the environment 100.

At 508, the data captured by one or more ARFNs 102 may be analyzed to generate contours of objects in the environment 100. In one implementation, at 512, data associated with surfaces within the environment 100 is segmented to identify different continuous surfaces within 3D images of the scene 202. In some instances, the segmentation of the 3D images of the scene 202 may produce 3D data sets corresponding to each respective continuous surface.

In an illustrative implementation, continuous surfaces within the scene 202 may be identified by determining distances between particular points in the scene 202 and the sensor 108. When the difference between respective distances between two points within the scene and the sensor 108 is less than or equal to a threshold distance, the two points are designated as being part of the same continuous surface. The threshold distance may be based, at least in part, on a sensitivity of the sensor 208. In some cases, the threshold distance may be no greater than about 7 mm, no greater than about 6 mm, no greater than about 5 mm, or no greater than about 4 mm. In a non-limiting illustrative example, the threshold distance may be within a range of about 2 mm to about 8 mm.

At 514, contours of the continuous surfaces identified in 3D images of the scene 202 may be extracted. In a particular implementation, 3D boundaries of the continuous surfaces may be determined. The 3D boundaries of the continuous surfaces may include 3D points located on the outermost edges or the periphery of the continuous surfaces of the scene 202. Subsequently, 2D contours of the continuous surfaces may be generated from the 3D boundaries. In some cases, the 2D contours of particular objects included in the 3D images of the scene 202 may be determined, such as the 2D contours of one or more hands located within the scene 202.

At 516, an object may be tracked in 3D images obtained by the sensor 208 by determining whether a first object in a first 3D image is the same as a second object in a second 3D image that is captured subsequent to the first 3D image. In some cases, the first image and the second image may include the same scene 202 and have the same camera field of view 210. In other instances, the first image and the second image may have a common reference point.

In one implementation, an overlap analysis may be performed at 518. The overlap analysis may include determining whether the first object in the first image overlaps with the second object in the second image. In a particular implementation, a region defined by 2D contours of the first object in the first image may be superimposed over a region defined by 2D contours of the second object in the second image to identify overlap between the first and second object.

In some situations, when an amount of overlap between a region defined by the 2D contours of the first object in the first image and a region defined by the 2D contours of the second object in the second image satisfies a threshold amount, the first object and the second object may be designated as the same object. In an implementation, the amount of overlap between the region defined by 2D contours of the first object and the region defined by the 2D contours of the second object may include a common area occupied by the first object and the second object within the scene 202. In another implementation, the amount of overlap between the region defined by the 2D contours of the first object and the region defined by the 2D contours of the second object may include a common area occupied by the first object and the second object with respect to a common reference point.

In one non-limiting illustrative example, the threshold amount may indicate that at least 5% of the area of the region defined by 2D contours of the second object overlaps with the area of the region defined by 2D contours of the first object, at least 20% of the area of the region defined by 2D contours of the second object overlaps with the area of the region defined by 2D contours of the first object, at least 45% of the area of the region defined by 2D contours of the second object overlaps with the area of the region defined by 2D contours of the first object, or at least 75% of the area of the region defined by 2D contours of the second object overlaps with the area of the region defined by 2D contours of the first object. In another non-limiting illustrative example, the threshold amount may indicate that about 10% to about 50% of the area of the region defined by 2D contours of the second object overlaps with the area of the region defined by 2D contours of the first object.

In some implementations, a location of overlap between a region of the first object and a region of the second object may also be analyzed to determine whether the first object is the same as the second object. Thus, a location of the overlap and an amount of the overlap may be two factors analyzed when determining whether the first object and the second object are the same. In some instances, the location of the overlap and the amount of the overlap may be associated with a respective weighting when conducting the overlap analysis. In particular situations, the amount of overlap may be weighted more heavily than the location of the overlap, while in other scenarios, the location of the overlap may be weighted more heavily than the amount of the overlap. Additionally, the amount of overlap and the location of the overlap may be weighted equally.

In some situations, the amount of overlap between an object in a first 3D image and an object in a second 3D image may be used to determine a speed of the object. For example, the speed of an object between a first 3D image and a second 3D image may be based on the number of 3D images that are captured within a particular period of time and the amount of overlap between the object in the first and second 3D images. A greater amount of overlap between the object in the first and second 3D images may indicate a slower speed than a lesser amount of overlap. Additionally, the speed and/or acceleration of the object in more than two 3D images may be estimated based, at least in part, on the amount of overlap between the object in the 3D images. To illustrate, when the amount of overlap between regions defined by the contours of the object in a sequence of 3D images is decreasing, the speed of the object may be increasing, while when the amount of overlap between regions defined by the contours of the object is increasing, the speed of the object may be decreasing.

When the regions defined by 2D contours of the first object and the second object do not overlap, when the amount of overlap between the first object and the second object does not satisfy the threshold amount, and/or when multiple objects (including the second object) overlap with the first object, a similarity analysis may be conducted at 520 to determine whether the first object is the same as the second object. In a particular implementation, the similarity analysis may include determining a similarity measurement metric for the first object and the second object. The respective similarity measurement metrics may be determined by translating points along the periphery of the first object and the second object into respective maps of the curvature of the first object and the second object and into respective maps of distances between points along the periphery of the first object and the second object. In an illustrative implementation, the curvature maps for the first object and the second object may be generated by mapping the curvature of the first object and the second object according to a predefined translation function associated with the respective curvatures of the first object and the second object. Additionally, the respective distance maps may be generated by mapping the distance between any two neighboring points around the boundaries of the first object and the second object.

The similarity metric for the first object and the second object may be determined using the distance maps of the first object and the second object to remove size differences caused by differences in depth between the first object and the second object. The similarity metric is also determined by evaluating the commonality between the respective curvature maps of the first object and the second object. When the commonality between the curvature map of the first object and the curvature map of the second object satisfies a threshold metric after accounting for differences in size using the distance maps, the second object in the second image may be designated to be the same as the first object in the first image. In situations where the commonality between the curvature map of the first object and the curvature map of the second object does not satisfy a threshold metric, the second object of the second image may be designated as being different from the first object of the first image.

In some cases, multiple objects in the second image may overlap with the first object in the first image. In these situations, a similarity metric may be determined for each of the objects in the second image that have a region overlapping with the first object in the first image. In particular, respective distance maps and curvature maps for each of the objects in the second image having a region that overlaps with the first object may be generated. In a manner similar to that described previously with respect to the second object, the curvature maps and distances maps of one or more additional objects that overlap with the first object may be utilized to determine whether one of the additional objects is the same as the first object in the first image. In addition, when multiple objects in the second image have regions that overlap with the first object, the location of the area of overlap may be utilized to determine which of the objects in the second image with regions overlapping those of the first object is the same as the first object. For example, when the first object includes a hand segment, objects in the second image that overlap with a forearm portion of the hand segment, a wrist portion of the hand segment, a palm portion of the hand segment, or a combination thereof, may be weighted more heavily in favor of being the same as the first object than objects of the second image that overlap finger portions of the hand segment in the first image. In the cases, where multiple objects of the second image have overlapping regions with the first object in the first image, one of the objects in the second image may be designated as being the same as the first object based, at least in part, on the similarity metrics between the overlapping objects in the second image and the first object in the first image, the amount of overlap between the regions of the overlapping objects in the second image and the first object, the location of the overlap between the overlapping objects in the second image and the first object in the first image, or a combination thereof.

In particular implementations, multiple objects in the second image may have similarity metrics in relation to the first object of the first image that exceed a threshold metric. In these instances, the object in the second image having the similarity metric with the greatest value may be designated as the first object in the first image.

Although the process 500 has been described in relation to determining overlap between regions of an object defined by contours of the object in a number of images, in some scenarios, the process 500 may be implemented using a 3D contour and a 3D point cloud. For example, 3D contours of objects may be generated from 3D data associated with a series of images of the scene 202 within the environment 100. In particular implementations, an overlap analysis of regions defined by the 3D contours may be conducted to determine whether an object in a first image of the scene 202 is the same as an object in a second image of the scene 202. To illustrate, a region defined by 3D contours of a first object in a first image may be superimposed over a region defined by 3D contours of a second object in a second image to identify any overlap between the regions. In a manner similar to that described previously, when an amount of overlap between the first object and the second object meets a threshold amount, the first object and the second object may be designated as being the same object.

Figure 6:
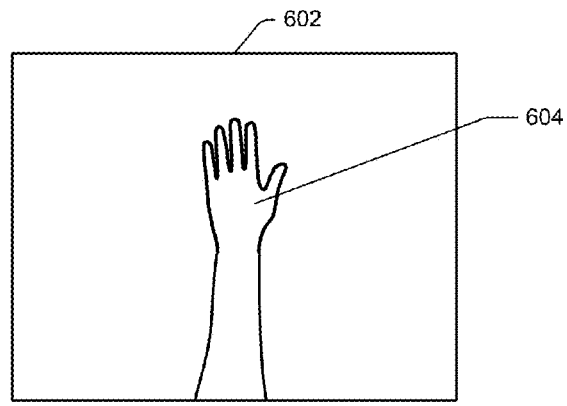
FIG. 6 illustrates a first example of a 2-Dimensional (2D) image of an environment at a first time, where the image includes contours of a first hand segment at a first position.

FIG. 6 illustrates a 2D image 602 of an environment at a first time, where the image 602 includes contours of a first hand segment 604 at a first position. The 2D image 602 may have been generated using data obtained by the one or more sensors 108 of FIG. 1, the camera 208 of FIG. 2, or both, of objects within the environment 100 of FIG. 1.

Figure 7:
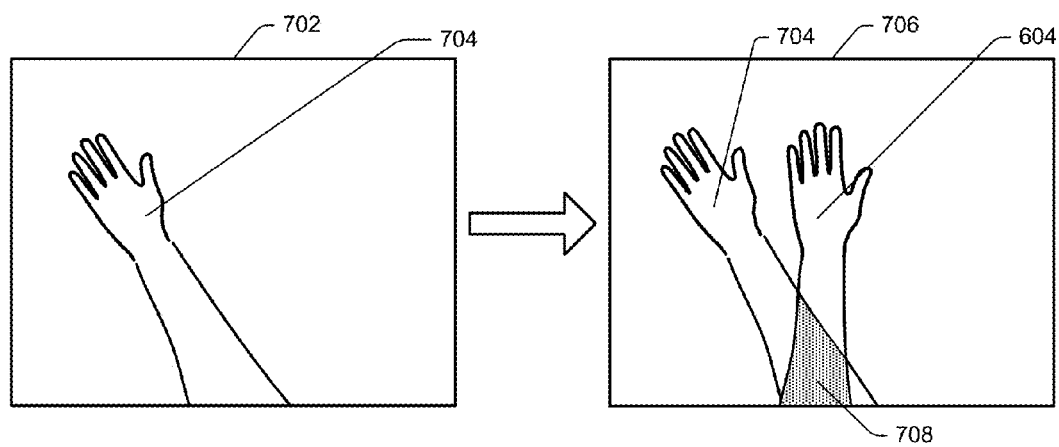
FIG. 7 illustrates a second example of a 2D image of the environment at a second time, where the image includes contours of a second hand segment at a second position, and a frame indicating an area of overlap between regions defined by the respective contours of the first hand segment at the first position and the second hand segment at the second position.

FIG. 7 illustrates a 2D image 702 of the environment at a second time subsequent to the first time, where the image 702 includes contours of a second hand segment 704 at a second position. FIG. 7 also includes a frame 706 indicating an area of overlap 708 between a region of the first hand segment 604 and a region of the second hand segment 704. According to implementations described previously herein, an analysis of the amount of the area of overlap 708 may be used to determine whether the second hand segment 704 is the same as the first hand segment 604. For instance, the amount of overlap between the hand segments 604 and 704 is computed to determine whether the overlap satisfies a threshold amount. As one example, the threshold amount may be anywhere from about 10% to about 50%. Thus, if the overlap area 708 exceeds a threshold of more than 10%, the first hand segment 604 and the second hand segment 705 may be designated as the same hand.

Figure 8:
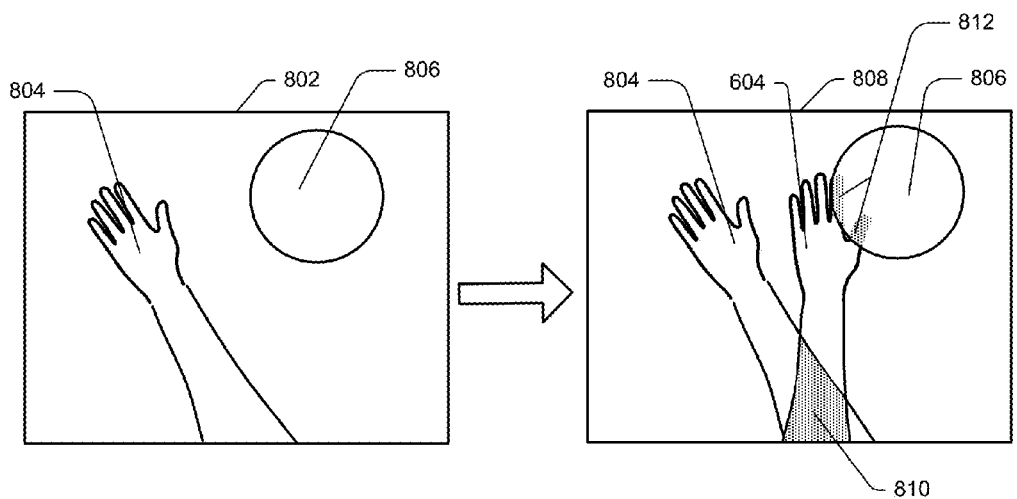
FIG. 8 illustrates a third example of a 2D image of the environment at a second time, where the image includes contours of the second hand segment at a second position and contours of an additional object, and a frame indicating an area of overlap between regions defined by the respective contours of the first hand segment at the first position and the second hand segment at the second position and an area of overlap between regions defined by the respective contours of the first hand segment at the first position and the additional object.

FIG. 8 illustrates a 2D image 802 of the environment at a second time, where the image 802 includes contours of a second hand segment 804 and an additional object 806 (e.g., a ball). FIG. 8 also includes a frame 808 indicating an area of overlap 810 between a region of the first hand segment 604 at the first position and a region of the second hand segment 804 at the second position. Additionally, the frame 808 indicates an area of overlap 812 between a region the first hand segment 604 and a region of the additional object 806. In this situation, the amount of the areas of overlap 810, 812 may be analyzed to determine whether the second hand segment 804 is the same as the first hand segment 604 or the additional object 806 is the same as the first hand segment 604. Additionally, a location of the areas of overlap 810, 812 may be analyzed to determine whether the second hand segment 804 or the additional object 806 is the same as the first hand segment 604. Further, the location of the areas of overlap 810, may be analyzed to determine whether the second hand segment or the additional object 806 is the same as the first hand segment 604. Still further, a first similarity metric for the second hand segment 804 with respect to the first hand segment 604 and a second similarity metric for the additional object 806 with respect to the first hand segment 604 may be analyzed to determine whether the second hand segment 804 or the additional object 806 is the same as the first hand segment 604.

In a non-limiting illustrative example, the ARFN 102 of FIGS. 1-4 may determine that the amount of the area of overlap 810 is greater than the amount of the area of overlap 812. Accordingly, the ARFN 102 may determine that the second hand segment 804 is more likely to be the first hand segment 604 than the additional object 806. The ARFN 102 may also determine that the location of the area of overlap 810, which is in a forearm portion of the first hand segment 604, and the location of the area of overlap 812, which is in a finger portion of the first hand segment 604, may indicate that the second hand segment 804 is more likely to be the first hand segment 604 than the additional object 806. Further, a similarity metric between the first hand segment 604 and the second hand segment 804 may be higher than a similarity metric between the first hand segment 604 and the additional object 806 (i.e., a round ball). Thus, the ARFN 102 may determine that the second hand segment 804 is more likely to be the first hand segment 604 than the additional object 806.

Figure 9:
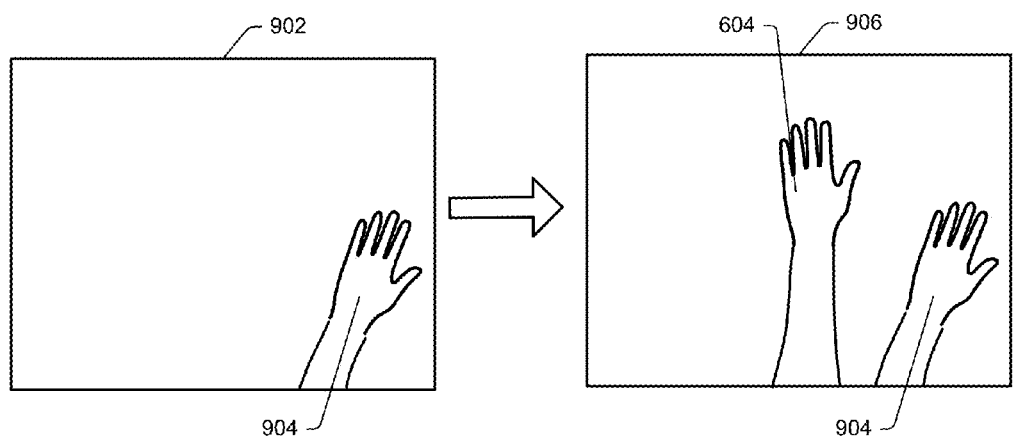
FIG. 9 illustrates a fourth example of a 2D image of the environment at a second time, where the image includes contours of an additional hand segment at a third position, and a frame indicating no area of overlap between regions defined by the respective contours of the first hand segment at the first position and the additional hand segment at the third position.

FIG. 9 illustrates a 2D image 902 of the environment at a second time, where the image 902 includes contours of an additional hand segment 904 at a third position. FIG. 9 also includes a frame 906 indicating no overlap between a region of the first hand segment 604 and a region of the additional hand segment 904. In this illustrative example, since there is no opportunity for an overlap analysis, the determination as to whether the additional hand segment 904 is the same as the first hand segment 604 may be based on a similarity metric generated for the first hand segment 604 and the additional hand segment 904.

Figure 10:
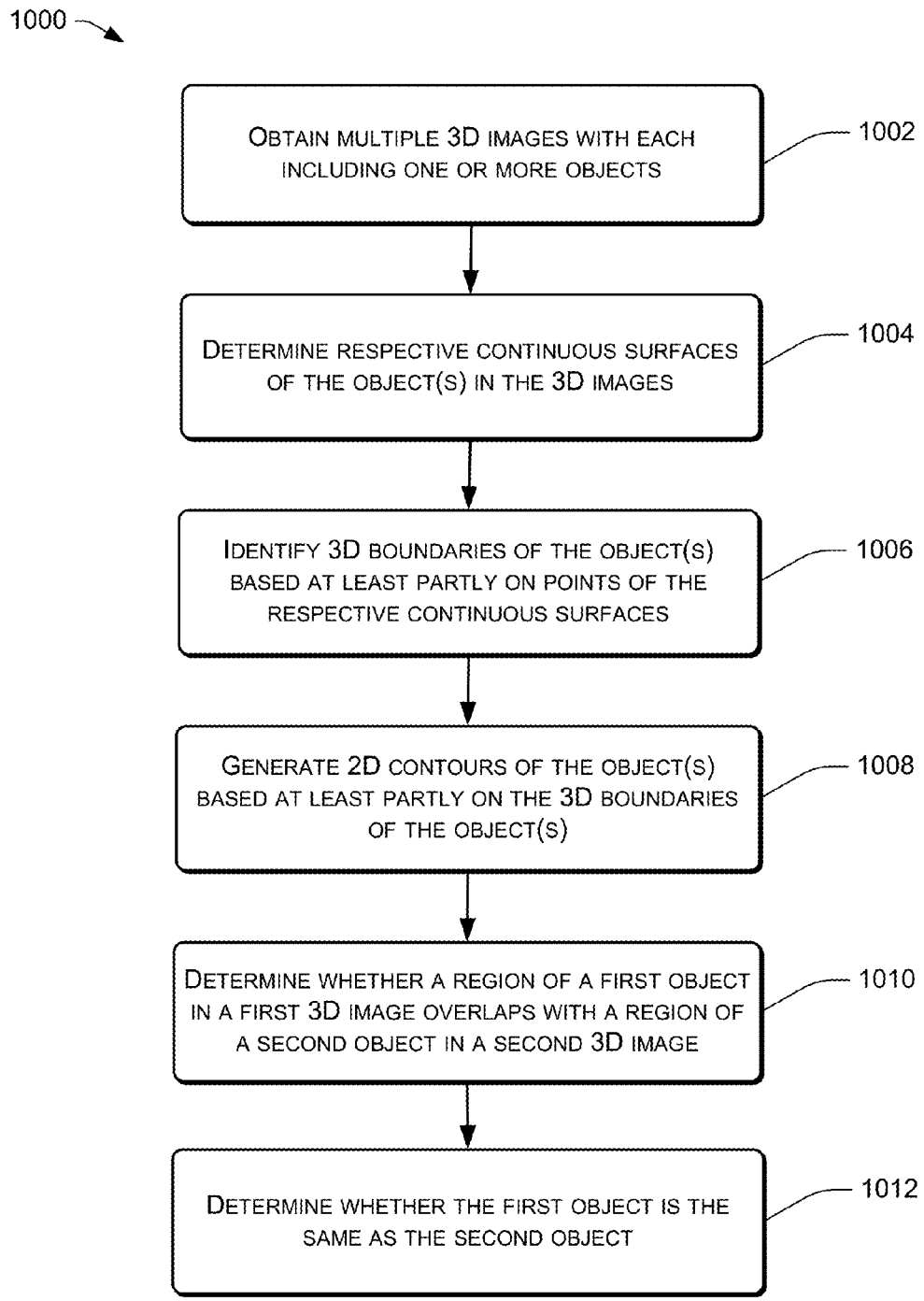
FIG. 10 shows an example flow diagram for determining whether a first object in a first 3-Dimensional (3D) image is the same as a second object in a second 3D image.

FIG. 10 shows an example process 1000 for determining whether a first object in a first 3D image is the same as a second object in a second 3D image. The process 1000 will be described as being performed in the environment 100 described previously herein, but may be performed in other environments, using other means of image capture and/or scene analysis. The process 1000 may be used to track the location of an object, such as a hand segment of a user, over time.

At 1002, the process 1000 includes obtaining a plurality of 3D images with each of the plurality of 3D images including one or more objects. In some cases, the plurality of 3D images may be obtained in a sequence over time via one or more sensors in the environment, such as the sensors 108 included in the ARFN 102 of FIGS. 1-4. In an illustrative implementation, the 3D images may be obtained within 0.05 seconds of each other. In a particular implementation, the plurality of 3D images may be obtained by projecting a structured light pattern onto a scene in the environment and capturing data of the scene that indicates interactions between one or more objects within the scene and the structured light pattern. In some cases, the plurality of 3D images may be obtained within the same field of view within the environment 100.

At 1004, the process 1000 includes determining respective continuous surfaces of the one or more objects in the plurality of 3D images. The respective continuous surfaces of objects in the plurality of 3D images may be determined by segmenting data associated with the objects in the plurality of 3D images. In one implementation, the respective continuous surfaces of the one or more objects may include determining a first distance between a first point of a surface in the environment 100 and the sensor 108 and determining a second distance between a second point of a surface in the environment 100 and the sensor 108. In situations, where the difference between the first distance and the second distance is less than or approximately equal to a particular distance, the first point and the second point may be designated as being part of the same continuous surface. When the difference between the first distance and the second distance is greater than the particular distance, the first point and the second point may be part of different continuous surfaces. In a non-limiting illustrative example, the particular distance may be about 4 mm. In some instances, at least one of the continuous surfaces in the plurality of 3D images may be a hand segment.

At 1006, the process 1000 includes identifying 3D boundaries of the one or more objects based at least partly on points of the respective continuous surfaces. At 1008, 2D contours of the one or more objects are generated based at least partly on the 3D boundaries of the one or more objects.

At 1010, the process 1000 includes determining whether a region of a first object in a first 3D image overlaps with a region of a second object in a second 3D image. When the first object overlaps with the second object, an amount of overlap between a region defined by the 2D contours of the first object and a region defined by the 2D contours of the second object may be determined. In an illustrative implementation, the first object may be a first hand segment and the second object may be a second hand segment. The first hand segment, the second hand segment, or both may include a number of portions, such as a forearm portion, a wrist portion, a palm portion, a fingers portion, which may or may not include a thumb, or a combination thereof.

At 1012, the process 1000 includes determining whether the first object is the same as the second object. There are many ways to make this determination. In one approach, the first object and the second object may be designated as the same object when the amount of overlap between regions defined by the contours of the first object and the second object satisfies a threshold amount. In another approach, a location of the overlap between the first object and the second object may be considered when determining whether the first object is the same as the second object. In yet another approach, the first object and the second object may be designated as the same object when a similarity metric of the first object and the second object meet a threshold metric.

Conclusion

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
one or more processors;
one or more cameras to obtain at least a first 3D image of an environment at a first time and a second 3D image of the environment at a second time subsequent to the first time;
one or more computer-readable media storing computer-executable instructions that, when executed by the one or more processors, cause the one or more processors to perform acts comprising:
detecting a first hand segment in the first 3D image;
detecting a second hand segment in the second 3D image;
identifying a first continuous surface in the first 3D image corresponding to the first hand segment;
determining first 3D boundaries of the first continuous surface;
generating a first contour of the first hand segment based, at least in part, on the first 3D boundaries of the first continuous surface;
identifying a second continuous surface in the second 3D image, the second continuous surface corresponding to the second hand segment;
determining second 3D boundaries of the second continuous surface;
generating a second contour of the second hand segment based, at least in part, on the second 3D boundaries of the second continuous surface;

determining whether a region defined by the second contours of the second hand segment overlaps with a region defined by the first contour of the first hand segment; and determining that the first hand segment and the second hand segment are a same respective hand segment when an amount of overlap between the region defined by the second contours of the second hand segment and the region defined by the first contours of the first hand segment satisfies a threshold amount.

2. The system of claim 1, wherein the acts further comprise determining a speed of the respective hand segment based, at least in part, on the amount of overlap between the region defined by the second contours of the second hand segment and the region defined by the first contours of the first hand segment.

3. The system of claim 1, wherein the first 3D image and the second 3D image are within a same field of view within the environment.

4. The system of claim 1, wherein the acts further comprise:

generating a first curvature map for the first contour and a second curvature map for the second contour according to a function that expresses the first contour in terms of changes in direction along the first contour and that expresses the second contour in terms of changes in direction along the second contour; and generating a first distance map for the first contour and a second distance map for the second contour according to a function that expresses an absolute value of a distance between respective points along the first contour and that expresses an absolute value of a distance between respective points along the second contour.

5. The system of claim 4, wherein the computer-executable instructions further perform acts comprising:

generating a similarity metric for the first hand segment and the second hand segment when the amount of overlap does not satisfy the threshold amount, the similarity metric being generated based, at least in part, on the first curvature map, the second curvature map, the first distance map, and the second distance map; and identifying the first hand segment as the second hand segment based, at least in part, on the similarity metric.

6. The system of claim 5, wherein the generating the similarity metric includes:

removing size differences caused by differences in depth between the first hand segment and the second hand segment based, at least in part, on the first distance map and the second distance map; and evaluating commonalties between the first curvature map and the second curvature map.

7. A method comprising:

obtaining a plurality of 3D images in succession, each of the plurality of 3D images including one or more objects;

determining respective continuous surfaces of the one or more objects in the plurality of 3D images by determining, for a first object of the one or more objects, that a difference between a first distance to a first point of a first surface of the first object and a second distance to a second point of a second surface of the first object is less than or approximately equal to a predetermined distance;

identifying 3D boundaries of the one or more objects based at least partly on the respective continuous surfaces;

generating 2D contours of the one or more objects based at least partly on the 3D boundaries of the one or more objects;

determining whether a region defined by 2D contours of the first object in a first 3D image of the plurality of 3D images overlap with a region defined by 2D contours of a second object in a second 3D image of the plurality of 3D images; and determining whether the first object is the same as the second object based at least in part on the determining whether the region defined by the 2D contours of the first object in the first 3D image overlap with the region defined by the 2D contours of the second object in the second 3D image.

8. The method of claim 7, wherein determining respective continuous surfaces of the one or more objects further includes:

determining the first distance between the first point of the first surface in a particular 3D image and a sensor capturing the particular 3D image; and determining the second distance between the second point of the second surface in the particular 3D image and the sensor.

9. The method of claim 7, wherein the predetermined distance is about 4 mm.

10. The method of claim 7, further comprising determining an amount of overlap between the first object in the first image and the second object in the second image.

11. The method of claim 7, wherein the second image is obtained within 0.05 seconds of the first image.

12. The method of claim 7, further comprising:

projecting a structured light pattern onto a scene, wherein the scene includes the one or more objects;

capturing data of the scene, wherein the data indicates interactions between the one or more objects within the scene and the structured light pattern; and generating a 3D image of the plurality of 3D images from the data of the scene.

13. One or more non-transitory computer-readable media storing computer-executable instructions that, when executed by one or more processors, cause the one or more processors to perform acts comprising:

detecting a hand segment in a first 3D image;

generating contours of the hand segment from the first 3D image;

detecting a plurality of objects in a second 3D image captured subsequent to the first 3D image;

generating contours of the plurality of objects in the second 3D image;

determining whether a region defined by a contour of a first object in the second 3D image and a region defined by a contour of a second object in the second 3D image overlap with a region defined by the contour of the hand segment; and determining whether the first object or the second object of the second 3D image are the same as the hand segment of the first 3D image based, at least in part, on a first overlap between the region defined by the contour of the first object and the region defined by the contour of the hand segment and a second overlap between the region defined by the contour of the second object and the region defined by the contour of the hand segment.

14. The one or more non-transitory computer-readable media of claim 13, wherein the acts further comprise:

determining a location of the first overlap with respect to the hand segment;

determining a location of the second overlap with respect to the hand segment; and determining whether the first object or the second object are the same as the hand segment based, at least in part, on the location of the first overlap and the location of the second overlap.

15. The one or more non-transitory computer-readable media of claim 14, wherein the location of the first overlap is a finger portion of the hand segment and the location of the second overlap is a forearm portion of the hand segment or a wrist portion of the hand segment.

16. The one or more non-transitory computer-readable media of claim 15, wherein the acts further comprise determining that the second object is the same as the hand segment.

17. The one or more non-transitory computer-readable media of claim 14, wherein the determining whether the first object or the second object of the second 3D image are the same as the hand segment of the first 3D image includes weighting an amount of the first overlap and an amount of the second overlap differently than the location of the first overlap and the location of the second overlap.

18. The one or more non-transitory computer-readable media of claim 13, wherein the acts further comprise:

generating a first curvature map for the contour of the first object, a second curvature map for the contour of the second object and a third curvature map for the contour of the hand segment according to a function that expresses the contour of the first object in terms of changes in direction along the contour of the first object, that expresses the contour of the second object in terms of changes in direction along the contour of the second object and that expresses the contour of the hand segment in terms of changes in direction along the contour of the hand segment; and generating a first distance map for the contour of the first object, a second distance map for the contour of the second object and a third distance map for the contour of the hand segment according to a function that expresses an absolute value of a distance between respective points along the contour of the first object, that expresses an absolute value of a distance between respective points along the contour of the second object and that expresses an absolute value of a distance between respective points along the contour of the hand segment.

19. The one or more non-transitory computer-readable media of claim 18, wherein the acts further comprise:

determining a first similarity metric with respect to the hand segment and the first object based, at least in part, on the first curvature map, the third curvature map, the first distance map and the third distance map; and determining a second similarity metric with respect to the hand segment and the second object based, at least in part, on the second curvature map, the third curvature map, the second distance map, and the third distance map.

20. The one or more non-transitory computer-readable media of claim 19, wherein the acts further comprise determining whether the first object or the second object is the same as the hand segment based, at least in part, on the first similarity metric and the second similarity metric.

* * * * *